(12) United States Patent
Sosa

(10) Patent No.: US 11,584,277 B1
(45) Date of Patent: Feb. 21, 2023

(54) REDUCED-IMPACT-AND-RECOIL HEADREST

(71) Applicant: Michael P. Sosa, Odessa, FL (US)

(72) Inventor: Michael P. Sosa, Odessa, FL (US)

(73) Assignee: Life Aligned Safety Products LLC, Odessa, FL (US)

( * ) Notice: Subject to any disclaimer, the term of this patent is extended or adjusted under 35 U.S.C. 154(b) by 0 days.

(21) Appl. No.: 17/445,565

(22) Filed: Aug. 20, 2021

Related U.S. Application Data

(63) Continuation-in-part of application No. 16/238,867, filed on Jan. 3, 2019, now Pat. No. 11,117,503, which is a continuation of application No. 15/934,424, filed on Mar. 23, 2018, now Pat. No. 10,207,617.

(51) Int. Cl.
    *B60N 2/80* (2018.01)
    *B60N 2/888* (2018.01)
    *B60N 2/865* (2018.01)
    *B60N 2/809* (2018.01)

(52) U.S. Cl.
    CPC ............. *B60N 2/888* (2018.02); *B60N 2/809* (2018.02); *B60N 2/865* (2018.02); *B60N 2002/899* (2018.02); *B60N 2205/20* (2013.01)

(58) Field of Classification Search
    CPC ........ B60N 2/809; B60N 2/865; B60N 2/888; B60N 2002/899; B60N 2205/20
    See application file for complete search history.

(56) References Cited

U.S. PATENT DOCUMENTS

| | | | |
|---|---|---|---|
| 5,054,856 A * | 10/1991 | Wang | B60N 2/853 297/409 |
| 6,045,181 A | 4/2000 | Ikeda et al. | |
| 7,048,334 B2 | 5/2006 | Pal et al. | |
| 7,926,871 B2 | 4/2011 | Meixner et al. | |
| 8,052,211 B2 | 11/2011 | Nilakantan | |
| 10,207,617 B1 | 2/2019 | Sosa | |
| 10,538,186 B2 * | 1/2020 | Sosa | B60N 2/888 |

(Continued)

FOREIGN PATENT DOCUMENTS

| | | | | |
|---|---|---|---|---|
| EP | 3176028 A1 * | 6/2017 | ........... | B60N 2/4808 |
| FR | 2979867 A1 * | 3/2013 | ........... | B60N 2/4814 |

*Primary Examiner* — Ryan D Kwiecinski
(74) *Attorney, Agent, or Firm* — Paul Murty; Owen G. Behrens; Smith & Hopen, P.A.

(57) ABSTRACT

A reduced-impact-and-recoil headrest that includes a ratchet mechanism, allowing components to incrementally translate with respect to each other. The reduced-impact-and-recoil headrest includes an exterior housing surface that is deformable, providing cushioning for a vehicle occupant's head. The headrest also includes an interior compartment within the housing, with the ratchet mechanism disposed within the interior compartment. The headrest is configured to decrease the force of a collision experienced by the occupant, thereby decreasing the likelihood and severity of traumatic brain injuries resulting from the occupant's head striking a stationary headrest. Instead, the reduced-impact-and-recoil headrest is configured to incrementally move with the occupant's head, providing an incremental cushion for the occupant's head. The ratchet mechanism also prevents the reduced-impact-and-recoil headrest from automatically translating back to its pre-impact position, thereby decreasing the occupant's risk of ligament tear and whiplash.

14 Claims, 8 Drawing Sheets

(56) References Cited

U.S. PATENT DOCUMENTS

| | | | |
|---|---|---|---|
| 10,780,809 B2 * | 9/2020 | Jeong | B60N 2/806 |
| 10,836,290 B2 * | 11/2020 | Inoue | B60N 2/879 |
| 11,117,503 B2 | 9/2021 | Sosa | |
| 2006/0119150 A1 * | 6/2006 | Hoffmann | B60N 2/888 |
| | | | 297/216.12 |
| 2008/0303262 A1 * | 12/2008 | Sakaki | B60N 2/888 |
| | | | 280/806 |
| 2013/0249268 A1 | 9/2013 | Hemmelrath et al. | |
| 2014/0145489 A1 * | 5/2014 | Wang | B60N 2/865 |
| | | | 297/410 |
| 2017/0291515 A1 * | 10/2017 | Soltner | B60N 2/80 |
| 2017/0341547 A1 * | 11/2017 | Tatewaki | B60N 2/865 |

\* cited by examiner

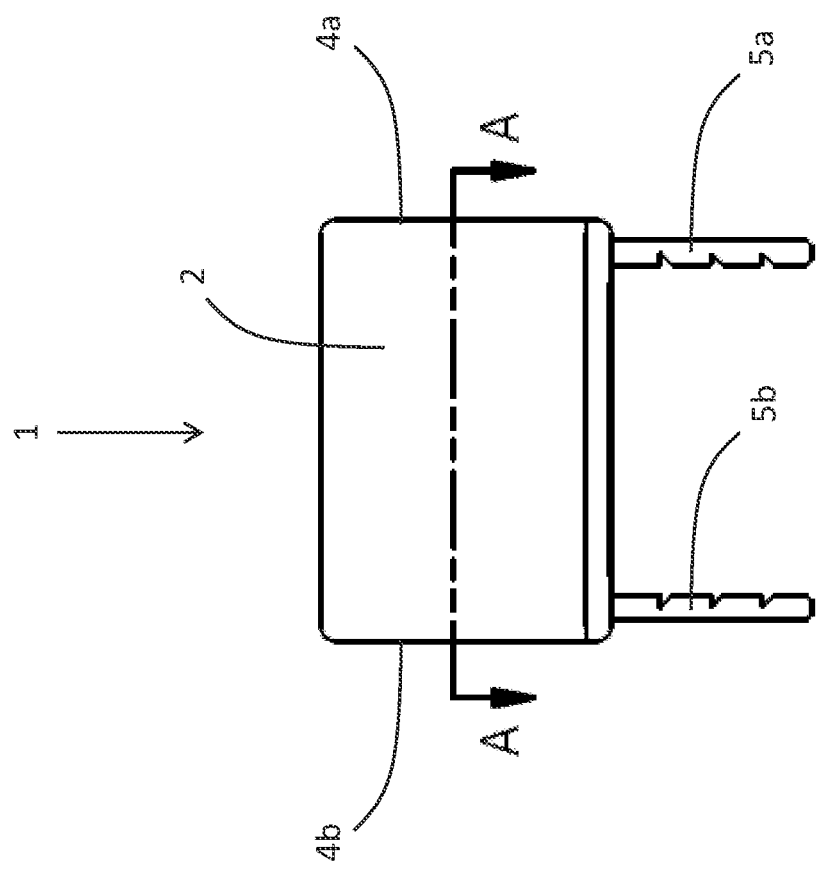
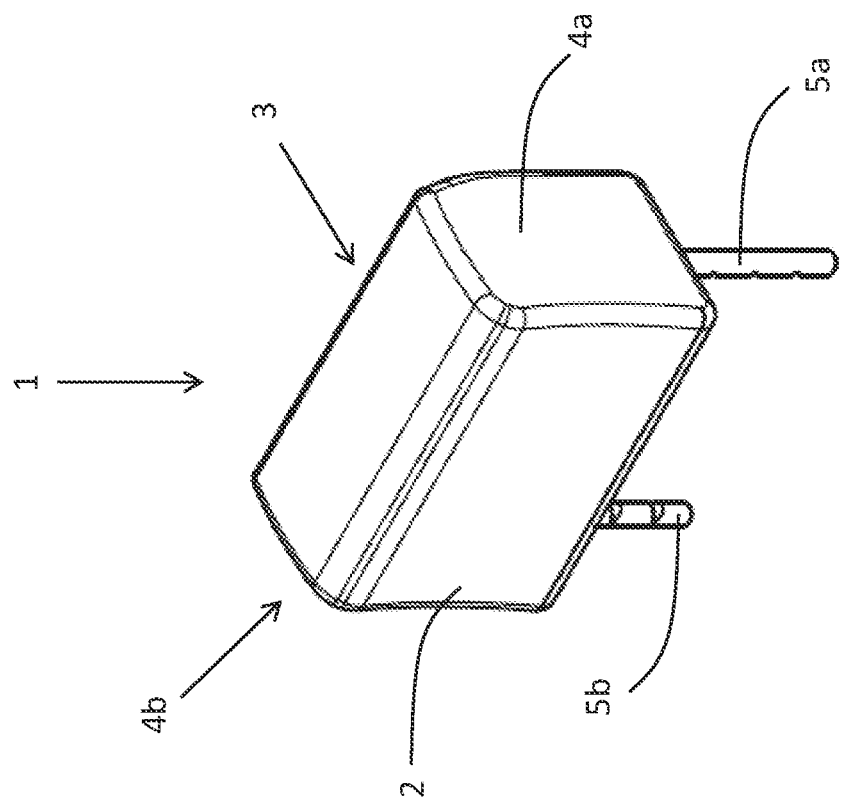
FIG. 1A
FIG. 1B

REDUCED-IMPACT-AND-RECOIL HEADREST

CROSS-REFERENCE TO RELATED APPLICATIONS

This nonprovisional application is a continuation-in-part of and claims priority to nonprovisional application Ser. No. 16/238,867, entitled "Reduced-Impact-And-Recoil Headrest," filed on Jan. 3, 2019, which is a continuation of and claims priority to nonprovisional application Ser. No. 15/934,424, entitled "Reduced-Impact-And-Recoil Headrest," filed on Mar. 23, 2018, issued as U.S. Pat. No. 10,207,617 on Feb. 19, 2019, each by the same inventor.

BACKGROUND OF THE INVENTION

1. Field of the Invention

This invention relates, generally, to a reduced-impact-and-recoil headrest. More specifically, it relates to a headrest that includes a ratchet mechanism, whereby the ratchet mechanism allows the headrest to cushion an occupant's head and prevents the occupant's head from springing toward a front end of a vehicle during a collision.

2. Brief Description of the Prior Art

Automotive accidents represent a leading cause of death and injury, both worldwide and in the United States. Safety measures exist to prevent injuries in the event of a collision, such as the use of seatbelts, airbags, and headrests. Despite these safety measures, thousands of people die in automotive accidents each year, with millions more obtaining injuries as a result of collisions. The frequency and severity of automotive accidents results in billions of dollars spent each year on insurance, treatments, and repair. [1].

Some of the most severe injuries sustained during an automotive accident are traumatic brain injuries (TBIs), such as a concussion, hematoma, contusion, whiplash, and skull fracture. TBIs are some of the most dangerous injuries that can occur, often leading to death or long-term injury. TBIs occur due to an occupants' brain contacting the skull in the event of an extreme force, which can cause bruising or bleeding of the brain. For example, during an automotive accident, the occupant's head could forcefully collide with the steering wheel of the automobile. Alternatively, the occupant's head could be forced backward, colliding with a headrest on a seat. While the headrest is often cushioned to some degree, the force of the collision and the stationary nature of the headrest can lead to a severe TBI.

Attempts have been made to introduce headrests that can detect and respond to a collision, decreasing the occupant's risk of TBI. U.S. Pat. No. 8,052,211 discloses an active headrest that is actuated to translate toward an occupant in the event of a collision. Similarly, U.S. Pat. No. 7,926,871 discloses a moveable headrest that that adjusts a two-point support system in the event of a collision. Support is shifted between two areas, depending on the impact of the collision and the location of the occupant's head. While both the '211 Patent and the '871 Patent disclose improvements on traditional headrests, the references rely on the movement of the headrest in relation to the occupant's head. As a result, the references inherently rely on sensors and other electronic components to control the headrest's movement. In the event of a sensor failure, the headrests would function similar to traditional headrests, losing the disclosed improvements. Moreover, the headrests do not cushion the occupant's head in the event of a collision; instead, the headrests remain stationary when receiving the occupant's head, thereby failing to gently cushion the head during the collision. Finally, the headrests do not reduce the recoil of the occupant's head toward the front end of the vehicle; instead, the occupant's head typically springs forward, which can lead to ligament tears and whiplash.

Accordingly, what is needed is a reduced-impact-and-recoil headrest that relies on a mechanical interaction between component parts to cushion an occupant's head and prevent whiplash in the event of an automobile collision. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a mechanical reduced-impact-and-recoil headrest that cushions a vehicle occupant's head and neck and minimizes recoil via a ratchet mechanism, thereby decreasing the impact felt by the occupant, is now met by a new, useful, and nonobvious invention.

The novel structure includes a housing having proximal wall opposite a distal wall. The housing is adapted to be installed within a vehicle having a longitudinal axis from a front bumper to a rear bumper, and a lateral axis from a driver side to a passenger side, with the distal wall oriented between the proximal wall and the rear bumper of the vehicle. A fixed mounting plate is disposed between the proximal wall and the distal wall. The fixed mounting plate includes a vertical wall that is oriented substantially parallel to each of the proximal wall and the distal wall and a bottom wall that extends perpendicularly away from the vertical wall in a direction toward the proximal wall, with a set of stalks extending in a direction away from the bottom wall. The set of stalks are configured to be received by a pair of complementary apertures disposed on an upper surface of a vehicle seat.

A locking plate is disposed adjacent to the fixed mounting plate, such that the locking plate is disposed between the fixed mounting plate and the proximal wall of the housing. A locking rod is secured at a first end to the proximal wall of the housing and secured at an opposing second end to the distal wall of the housing, such that the locking rod is mechanically coupled to the locking plate, and such that the locking rod experiences a friction force resulting from a coefficient of friction between the locking rod and the locking plate.

In an embodiment, a set of opposing pivoting rod supports are coupled to the locking plate, with a bottom surface of each pivoting rod support residing adjacent to the bottom wall of the fixed mounting plate. A pivoting rod is coupled to and spans between the opposing pivoting rod supports, such that the locking plate is configured to rotate about the pivoting rod, wherein a clockwise rotation of the locking plate increases a contacting surface between the locking rod and the locking plate, thereby increasing the friction force experienced by the locking rod. In an embodiment, an elongated slot is defined within the locking plate and an adjustment screw disposed through the slot and secured to a bracket of the fixed mounting plate, with the bracket extending perpendicularly in a direction away from the bottom wall of the fixed mounting plate The adjustment screw is configured to rotate the locking plate about the pivoting rod when the adjustment screw is tightened.

In use, the distal wall of the housing is configured to be adjacent to the fixed mounting plate in a pre-impact configuration, and proximal wall of the housing is configured to be adjacent to the fixed mounting plate in a post-impact configuration. The locking rod is configured to slow a translation of the proximal wall in a direction toward the fixed mounting plate due to the friction force between the locking rod and the locking plate. In an embodiment, the headrest includes a reset tab that is in mechanical communication with the locking plate. The reset tab is configured to receive a force to detach the locking plate from the fixed mounting plate, such that the distal wall can be reset to be disposed adjacent to the fixed mounting plate.

In an embodiment, the locking rod is a first locking rod, and the headrest includes a second locking rod secured at a first end to the proximal wall of the housing and secured at an opposing second end to the distal wall of the housing, such that the second locking rod is mechanically coupled to the locking plate, and such that the second locking rod experiences a friction force resulting from a coefficient of friction between the second locking rod and the locking plate. A central rod may be secured at a first end to the proximal wall of the housing and secured at an opposing second end to the distal wall of the housing, with the central rod disposed between the first locking rod and the second locking rod. A flange is disposed adjacent to the locking plate, such that the flange is disposed to receive the central rod therethrough. The flange includes a bearing disposed therein that is mechanically coupled to the central rod to restrict axial movement thereof.

In an embodiment, a mounting rod is secured at a first end to the proximal wall of the housing and secured at an opposing second end to the fixed mounting plate. A biasing member is disposed on the mounting rod, with the biasing member being in mechanical communication to each of the proximal wall and the fixed mounting plate. The biasing member exerts a force on the proximal wall in a direction away from the fixed mounting plate. In an embodiment, the biasing member is a concentric spring. In an embodiment, the mounting rod is a first mounting rod, and a second mounting rod is secured at a first end to the proximal wall of the housing and secured at an opposing second end to the fixed mounting plate, with the second mounting rod being spaced apart from the first mounting rod.

An object of the invention is to provide a ratchet mechanism that decreases the risk and impact of a traumatic brain injury and minimizes the recoil of an occupant's head, thereby preventing whiplash in the event of a vehicle collision, without relying on sensors or other electrical components.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 1A is a perspective view of a reduced-impact-and-recoil headrest.

FIG. 1B is a proximal side view of a reduced-impact-and-recoil headrest.

DETAILED DESCRIPTION OF THE INVENTION

Figure 2:
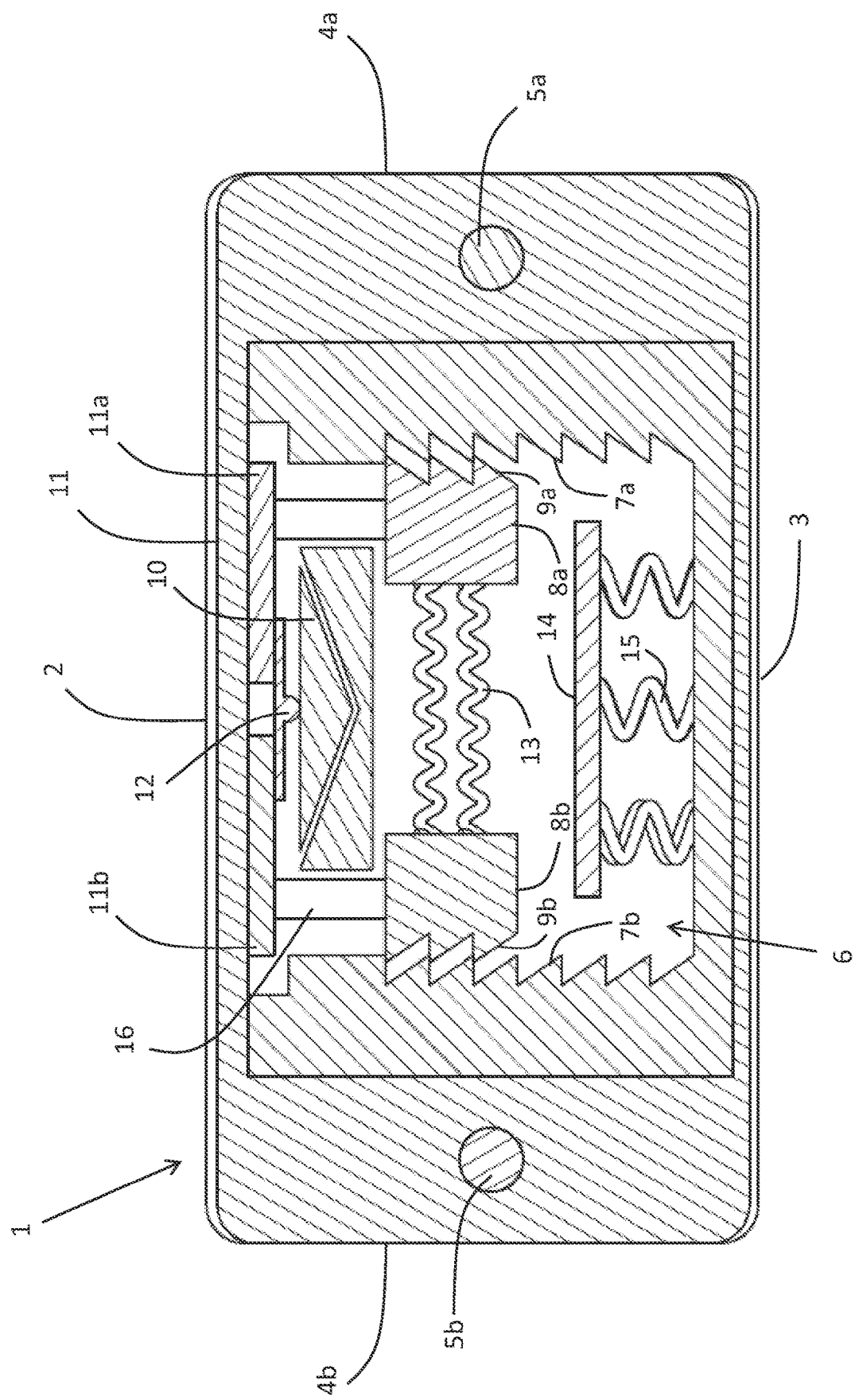
FIG. 2 is a cross-sectional view of a reduced-impact-and-recoil headrest with a stationary housing along section line A-A of FIG. 1B.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In a two-car collision, one car transfers kinetic energy to the other car, thereby exerting a force on the occupants of each car. For example, if a moving vehicle strikes a stationary vehicle from behind, the moving vehicle transfers kinetic energy to the stationary vehicle. As the stationary vehicle gains the kinetic energy transferred by the moving vehicle, the stationary vehicle translates away from the point of impact. While this happens, an occupant within the stationary vehicle translates toward the point of impact as a result of the impact's force. After the previously-stationary vehicle comes to rest, the occupant typically translates away from the point of impact, toward his or her initial position. As a result, a rear-end collision typically results in the occupant's head impacting a headrest before returning to an initial position. Similarly, a front-end collision results in the occupant's head translating toward a windshield before translating back toward the headrest. In either collision, there is a risk that the occupant's head contacts the headrest at some point during the collision. If the headrest is unmovable, the occupant can experience a traumatic brain injury from striking the headrest with a force.

The present invention includes a reduced-impact-and-recoil headrest including complementary components adapted to translate upon impact via a ratchet mechanism. The ratchet mechanism is adapted to cushion a vehicle occupant's head during a collision, as well as minimize recoil to prevent whiplash. The reduced-impact-and-recoil headrest includes a housing and a bracket disposed within the housing. The bracket and the housing each include complementary surfaces configured to form a part of the ratchet mechanism. During an impact, either the housing or the bracket translates with respect to the other component, allowing the occupant's head and neck to be cushioned from the full force of the impact. In addition, the opposing surfaces of the ratchet mechanism prevent the translatable component from recoiling toward an initial position, thereby minimizing the risk of the occupant experiencing whiplash.

As shown in FIGS. 1A and 1B, reduced-impact-and-recoil headrest 1 includes one or more exterior walls, such as proximal wall 2 opposite distal wall 3. Side walls 4a, 4b mechanically couple to proximal wall 2 and distal wall 3. Side walls 4a, 4b may be referred to as a driver-side-facing wall and a passenger-side-facing wall, depending on the orientation of reduced-impact-and-recoil headrest 1 within a vehicle Reduced-impact-and-recoil headrest 1 includes stalks 5a, 5b, which extend downward and away from headrest 1. Stalks 5a, 5b are adapted to be received by a pair of complementary apertures disposed on the upper surface of a seat within a vehicle, similar to prior art headrests. When reduced-impact-and-recoil headrest 1 is installed in the vehicle via stalks 5a, 5b, proximal wall 2 is adapted to face a front windshield of the vehicle, thereby being disposed to receive an occupant's head.

As shown in FIG. 2, the one or more exterior walls of reduced-impact-and-recoil headrest 1 forms a housing. During a collision or other impact, when kinetic energy is transferred between vehicles involved in the collision, the occupants of the vehicles often contact headrests with a force determined by the transferred energy. As such, proximal wall 2 is adapted to translate toward distal wall 3 when proximal wall 2 receives a vehicle occupant's head, due to the force exerted on proximal wall 2 by the occupant. The housing is adapted to be installed within a vehicle via stalks 5a, 5b, as described above. Alternatively, the housing could include apertures in place of stalks 5a, 5b, to retrofit the housing onto pre-existing stalks on a vehicle seat.

Figure 3A:
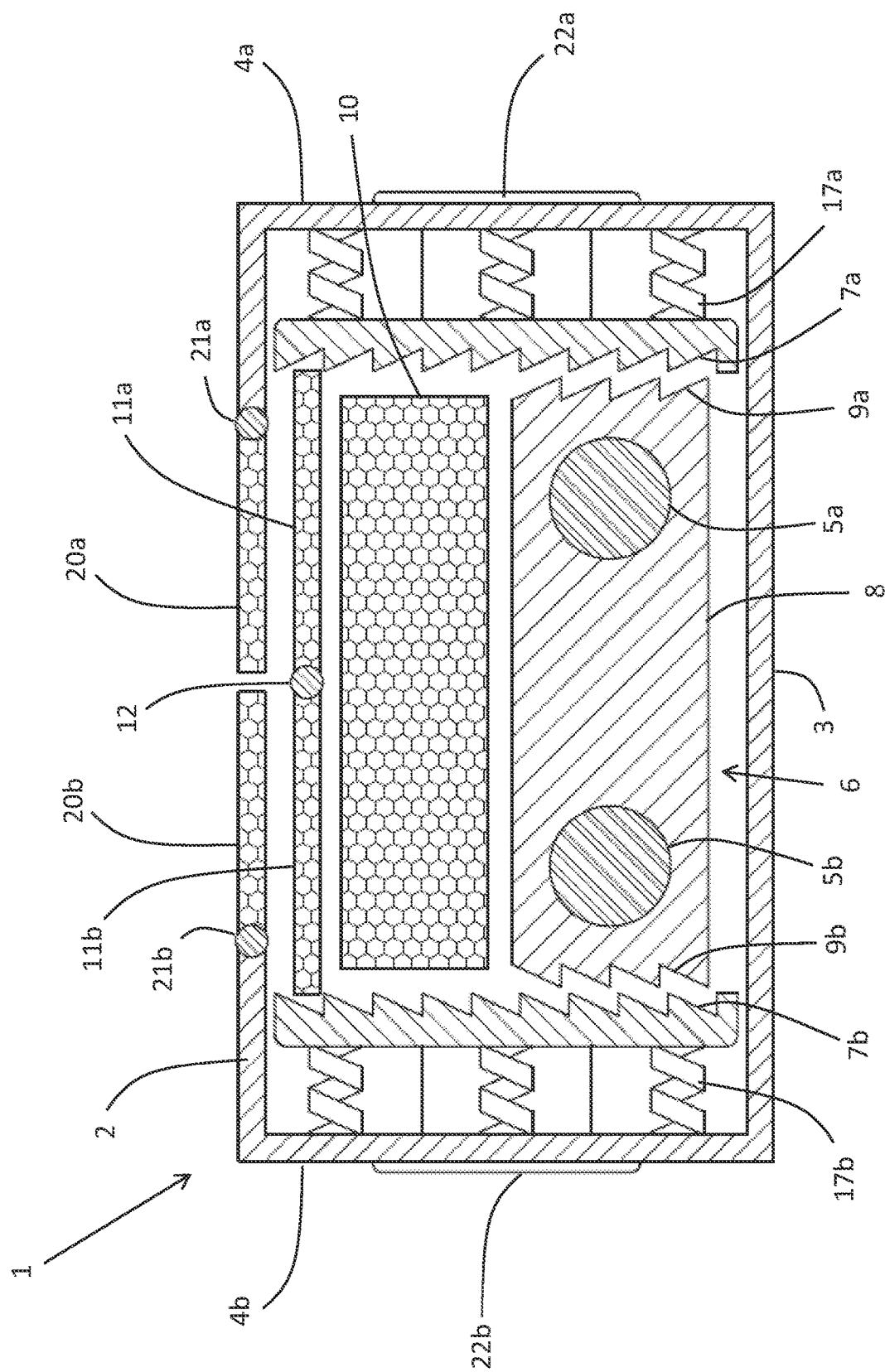
FIG. 3A is a cross-sectional view of a reduced-impact-and-recoil headrest with a nonstationary housing in a pre-impact configuration.
Figure 3B:
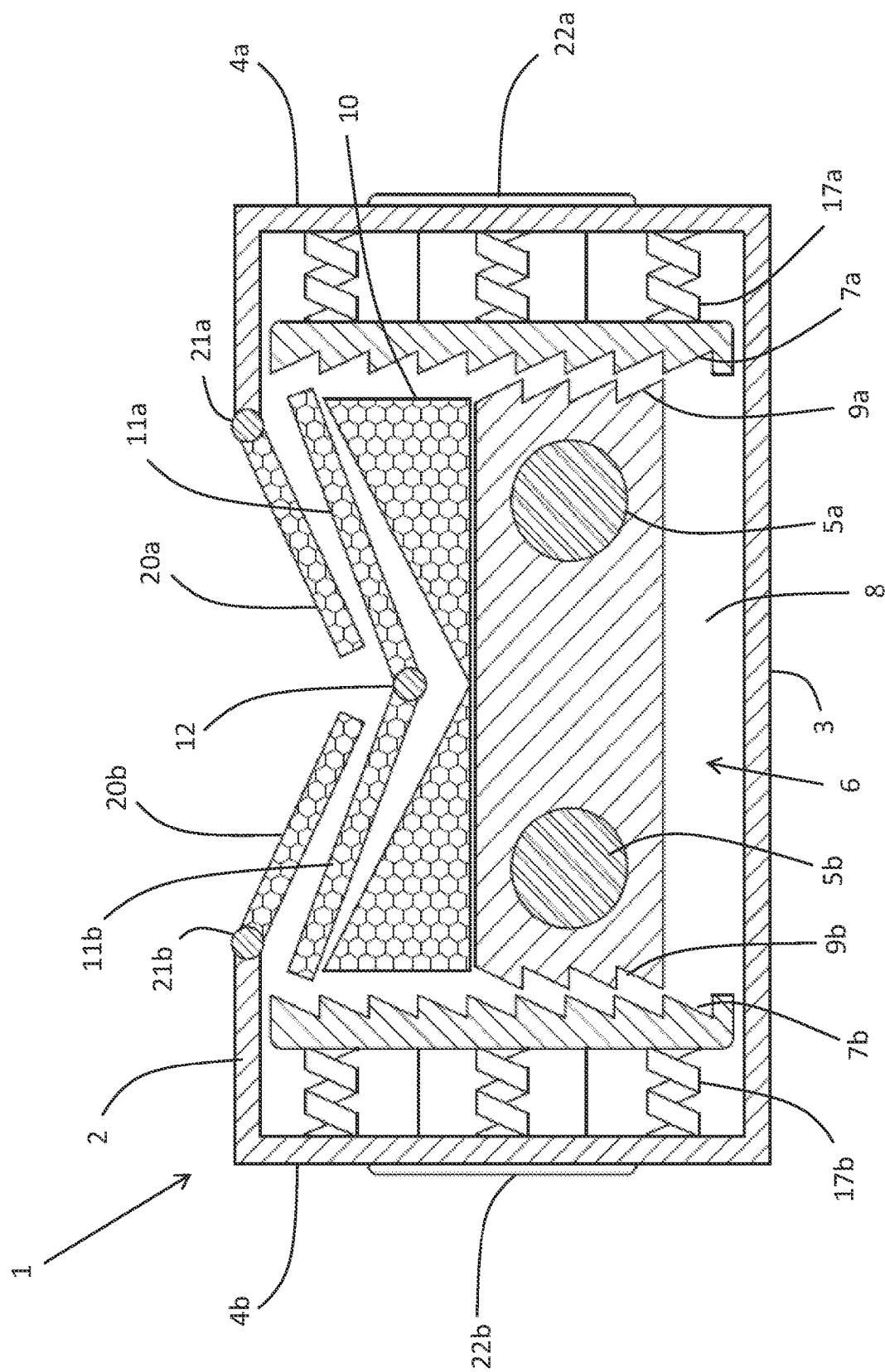
FIG. 3B is a cross-sectional view of a reduced-impact-and-recoil headrest with a nonstationary housing in a post-impact configuration.

Referring now to FIGS. 2-3B, the housing includes interior compartment 6 disposed therein. Interior compartment 6 is partially defined by first lateral interior wall 7a, which may be referred to as ratchet wall 7a, and second lateral interior wall 7b, which may be referred to as ratchet wall 7b (first and second ratchet walls 7a, 7b may be referred to collectively as ratchet walls 7). Ratchet walls 7 are defined by a plurality of tapered cutouts that are acute with respect to a lateral axis of reduced-impact-and-recoil headrest 1. The lateral axis spans from proximal wall 2 to distal wall 3. Each tapered cutout provides a downward slope from proximal wall 2 to distal wall 3, the slopes extending away from side walls 4a, 4b.

Bracket 8 is disposed within interior compartment 6, and includes first and second lateral contacting surfaces 9a, 9b, which may be referred to as ratcheting surfaces 9a, 9b (collectively referred to as ratcheting surfaces 9). Each of ratcheting surfaces 9a, 9b are defined by a plurality of tapered extensions from opposing sides of bracket 8. The tapered extensions thereby extend toward side walls 4a, 4b, and are achiral with respect to ratchet walls 7. Because ratcheting surfaces 9 and ratchet walls 7 are achiral with respect to each other, the tapered extensions of ratcheting surfaces 9 can be received by the tapered cutouts of ratchet walls 7, forming a rectangular shape. Accordingly, ratcheting surfaces 9 can be described as being complementary to ratchet walls 7. While the cutouts and extensions are described as being tapered, it is contemplated that a similar ratchet mechanism can be accomplish through polygonal cutouts and extensions, so long as the extensions require a force to translate to different cutouts, and vice versa.

Moreover, the achiral relationship between ratcheting surfaces 9 and ratchet walls 7 allows bracket 8 to translate toward distal wall 3 along the individual tapered cutouts of ratchet walls 7. The ratchet mechanism, which includes ratcheting surfaces 9 and ratchet walls 7, thereby allows ratcheting surfaces 9 to rest on ratchet walls 7 in a pre-impact configuration, and slide down the tapered cutouts after a force is exerted against proximal wall 2. As such, the ratchet mechanism allows proximal wall 2 to translate toward distal wall 3. Since ratcheting surfaces 9 travel down the slopes created by the tapered cutouts of ratchet walls 7, the friction between ratcheting surfaces 9 and ratchet walls 7 slow the translation of bracket 8 toward distal wall 3. As a result of the interaction between bracket 8 and ratchet walls 7, and the friction between the surfaces during translation, reduced-impact-and-recoil headrest is adapted to dampen the force of the impact on the occupant's head and neck. In addition, ratcheting surfaces 9 cannot travel back toward the front end of the vehicle due to the slopes of ratchet walls 7, which thereby minimizes the occupant's risk of whiplash caused by the occupant's head and neck recoiling back toward the front of the vehicle post-collision.

As seen in FIG. 2, bracket 8 includes two halves, 8a and 8b, that are joined together via spring 13, which is a biasing member. Half 8a includes ratcheting surface 9a, and half 8b includes ratcheting surface 9b, with ratcheting surfaces 9a, 9b adapted to incrementally translate along first and second ratchet walls 7a, 7b. Spring 13 allows halves 8a, 8b to translate toward and away from each other along the lateral axis of a vehicle from driver side to passenger side. In addition, spring 13, as a biasing member, forces at least one of ratcheting surfaces 9a, 9b and at least one of ratchet walls 7a, 7b into contact with each other.

During an impact, a portion of the kinetic energy of the impact is transferred to bracket 8, which causes bracket 8 to translate toward distal wall 3. Because ratcheting surfaces 9a, 9b are mechanically coupled to first and second ratchet walls 7a, 7b, some of the kinetic energy is lost due to the friction between surfaces 9a, 9b and walls 7a, 7b, as discussed above. As bracket 8 translates along ratchet walls 7, the tapered extensions of ratcheting surfaces 9a, 9b must translate to a different tapered cutout on first and second ratchet walls 7a, 7b, in order to allow bracket 8 to continue its translation toward distal wall 3. The kinetic energy of the impact thereby causes spring 13 to compress, which allows halves 8a, 8b to translate toward each other along the longitudinal axis of reduced-impact-and-recoil headrest 1, as ratcheting surfaces 9 travel down ratchet walls 7. In this orientation, the housing is stationary via the attachment of stalks 5a, 5b to a vehicle's seat, and bracket 8 translates with respect to the housing.

Referring again to FIG. 2, the housing includes interior proximal wall 11 disposed within interior compartment 6 and adjacent to proximal wall 2. Interior proximal wall 11 includes two halves 11a, 11b, which are hingedly coupled via hinge 12. As shown in FIG. 2, interior proximal wall 11 is sized to span from ratchet wall 7a to ratchet wall 7b, but is not long enough to allow halves 11a, 11b to rest on the tapered cutouts of ratchet wall 7a, 7b. As such, halves 11a, 11b will not catch on ratchet walls 7a, 7b, allowing internal proximal wall 11 to smoothly and continuously translate toward distal wall 3 without prematurely stopping due to frictional forces, which could cause whiplash or other similar injuries to an occupant.

Because interior proximal wall 11 includes hinge 12, interior proximal wall 11 is configured to deform about hinge 12 during an impact. When proximal wall 2 deforms as a result of the force exerted by the occupant's head, proximal wall 2 contacts interior proximal wall 11. Proximal wall 2 then transfers kinetic energy to interior proximal wall 11, thereby forcing interior proximal wall 11 toward distal wall 3. Because interior proximal wall 11 includes halves 11a, 11b, which are adapted to rest on ratchet walls 7a, 7b in a pre-impact configuration, interior proximal wall deforms about hinge 12 during the impact. The deformation occurs because halves 11a, 11b are initially retained by ratchet walls 7a, 7b, and the force of the occupant's head causes hinge 12 to translate along the lateral axis of reduced-impact-and-recoil headrest 1 toward distal wall 3. A result of the translation of hinge 12 is that half 11a radially translates in a counterclockwise direction about hinge 12, since half 11a remains connected to ratchet wall 7a. Similarly, half 11b radially translates in a clockwise direction about hinge 12, since half 11b remains connected to ratchet wall 7b. As hinge 12 continues to translate toward distal wall 3, the angle defined by hinge 12 with respect to the longitudinal axis of reduced-impact-and-recoil headrest becomes greater than the angle of ratchet walls 7. As a result, halves 11a, 11b travel down ratchet walls 7, similar to the translation of ratcheting surfaces 9a, 9b, above, allowing halves 11a, 11b to incrementally translate toward distal wall 3.

Interior proximal wall 11 is in mechanical communication with interior proximal wall 11 via extensions 16. Extensions 16 function similar to spring door stops by being rigid enough to remain stationary during non-impact situations, yet flexible enough to allow bracket halves 8a, 8b to translate toward and away from each other during an impact. After the impact is over, and after proximal wall 2 reaches a terminal point, extensions 16 return to the initial rigid state. The flexibility of extensions 16 allows ratcheting surfaces 9a, 9b to travel down respective ratchet walls 7a, 7b, thereby allowing proximal wall 2, interior proximal wall 11, and bracket 8 to translate toward distal wall 2. In addition, the rigidity of extensions 16 prevent bracket halves 8a, 8b from translating toward distal wall 3 without a sufficient force on proximal wall 2.

As shown in FIG. 2, dampening members are disposed within interior compartment 6 to further cushion the occupant's head during an impact. The dampening members are adapted to slow the incremental translation of bracket 8 from proximal wall 2 toward distal wall 3. For example, foam cushion 10 is disposed adjacent to proximal wall 2, between proximal wall 2 and bracket 8. Foam cushion 10 is adapted to absorb part of the impact by slowing the translation of proximal wall 2 and/or interior proximal wall 11 toward distal wall 3. Foam cushion 10 is made of a deformable material, allowing foam cushion 10 to absorb impact, compress, and decompress after the force of the impact has dissipated.

In addition, interior compartment 6 includes receiving platform 14, which is disposed adjacent to distal wall 3. Receiving platform 14 is secured against distal wall 3 via one or more springs 15, which apply a biasing force on receiving platform 14 in a direction toward proximal wall 2. During an impact, when bracket 8 translates toward distal wall 3, receiving platform 14 is adapted to receive bracket 8, preventing bracket 8 from directly contacting distal wall 3. Springs 15 are configured to compress when bracket 8 couples with receiving platform 14, thereby dampening the translation of bracket 8 toward distal wall 3. When the biasing force of springs 15 is of greater magnitude than the force of the impact, springs 15 are adapted to decompress, thereby translating receiving platform 14 in a direction toward proximal wall 2. Receiving platform 14 can thereby translate bracket 8 in a direction toward proximal wall 2 to a final, resting, post-impact position. Receiving platform 14 can also return bracket 8 to its initial, pre-impact position, depending on the length of springs 15.

Turning now to FIG. 3A, an embodiment of reduced-impact-and-recoil headrest 1 includes a stationary bracket 8 and a translatable housing. Bracket 8 is installed in a vehicle seat via stalks 5a, 5b, anchoring bracket 8 within a pair of complementary apertures disposed in an upper surface of the vehicle seat. In this configuration, the housing is adapted to translate with respect to bracket 8. For example, during an impact, proximal wall 2 is adapted to incrementally translate along a lateral axis of reduced-impact-and-recoil headrest 1 toward distal wall 2, via a ratchet mechanism similar to the mechanism described in detail above.

As shown in FIG. 3A, proximal wall 2 is discontinuous and includes first member 20a and second member 20b. First and second members 20a and 20b are adapted to pivot about hinges 21a, 21b, respectively. Hinges 21a, 21b allow first and second members 20a, 20b to radially translate toward interior compartment 6 during an impact, when an occupant's head transfers kinetic energy to reduced-impact-and-recoil headrest 1. Specifically, first member 20a is adapted to radially translate in a counterclockwise direction, and second member 20b is adapted to radially translate in a clockwise direction, both translating toward interior compartment 6.

Interior proximal wall 11 is disposed within interior compartment 6, and is sized to span from ratchet wall 7a to ratchet wall 7b, with halves 11a, 11b resting on respective ratchet walls 7a, 7b. Because the housing translates in this embodiment, halves 11a, 11b are adapted to mechanically connect with ratchet walls 7a, 7b, with the frictional forces between the components aiding in translating the housing with respect to bracket 8. In addition, halves 11a, 11b are hingedly coupled to each other via hinge 12. As discussed above, interior proximal wall 11 is thereby configured to translate along the lateral axis of reduced-impact-and-recoil headrest 1 toward distal wall 3 during an impact, with the translation occurring incrementally via the interaction between interior proximal wall 11 and ratchet walls 7a, 7b.

In this embodiment, each half 11a, 11b of interior proximal wall 11 is translated upon receiving respective members 20a, 20b of proximal wall 2. In particular, when first and second members 20a, 20b of proximal wall 2 radially translate toward interior compartment 6, interior proximal wall halves 11a, 11b are adapted to receive respective first and second members 20a, 20b. After receiving members 20a, 20b, interior proximal wall 11 is adapted to deform about hinge 12 and translate along the lateral axis of reduced-impact-and-recoil headrest 1 via the ratchet mechanism discussed above. Since halves 11a, 11b rest on the tapered cutouts of respective ratchet walls 7a, 7b, interior proximal wall 11 is thereby adapted to pull the housing toward bracket 8 upon an impact as a result of the mechanical connection. Accordingly, during an impact, both exterior proximal wall 2 and interior proximal wall 11 are configured to deform and translate in a direction toward distal wall 3.

First and second ratchet walls 7a, 7b are mechanically coupled to side walls 4a, 4b, respectively. Specifically, first ratchet wall 7a is coupled to side wall 4a via springs 17a, and second ratchet wall 7b is coupled to side wall 4b via springs 17b. Each of springs 17a, 17b are biasing members that apply a biasing force toward the opposite spring (i.e., spring 17a applies a biasing force toward spring 17b, and vice versa). As biasing members, springs 17a, 17b force at least one of the ratchet walls 7a, 7b into contact with at least one of the ratcheting surfaces 9a, 9b. Springs 17a, 17b are also adapted to compress toward respective side walls 4a, 4b if ratchet walls 7a, 7b experience a force of a greater magnitude than that of the biasing forces, such as the force of an impact caused by a collision.

As noted above, bracket 8 is stationary in the embodiment of FIG. 3A. Accordingly, the housing translates about bracket 8 in this embodiment. As such, during an impact, proximal wall 2 and distal wall 3 remain oriented substantially parallel to each other and to the longitudinal axis of reduced-impact-and-recoil headrest 1, while members 20a, 20b mechanically coupled to proximal wall 2 translate toward interior compartment 6. Moreover, because bracket 8 includes ratcheting surfaces 9a, 9b, which are defined by a plurality of tapered extensions, the housing incrementally translates along ratcheting surfaces 9a, 9b via first and second ratchet walls 7a, 7b according to the ratchet mechanism described above.

During the translation, the kinetic energy of the impact is transferred to the housing, which then translates with respect to stationary bracket 8. The impact force is greater than the lateral component of the forces of springs 17a, 17b, which allows housing to laterally translate. However, since ratchet walls 7a, 7b are mechanically coupled to ratcheting surfaces 9a, 9b, springs 17a, 17b must be partially compressed in a longitudinal direction to allow the housing to laterally translate. Springs 17a, 17b are longitudinally compressed as a result of the mass of bracket 8 that is mechanically coupled to a vehicle seat. Because bracket 8 is stationary, a portion of the kinetic energy from the impact is transferred to ratchet walls 7a, 7b, which thereby partially compresses springs 17a, 17b. When springs 17a, 17b compress, and ratchet walls 7a, 7b longitudinally translate toward respective side walls 4a, 4b, the housing can incrementally translate toward bracket 8. The interaction between ratchet walls 7a, 7b and ratcheting surfaces 9a, 9b results in friction that slows the lateral translation of the housing.

The housing includes reset tabs 22a, 22b disposed on opposite side walls 4a, 4b of the housing. Reset tabs 22a, 22b act as a placement mechanism for the housing, allowing a user to position the housing at desired locations. Reset tabs 22a, 22b are adapted to be pulled away from side walls 4a, 4b of the housing along the lateral axis of the vehicle, which allows the housing to be positioned. Reset tabs 22a, 22b allow such positioning by being mechanically coupled to springs 17a, 17b, respectively. An example of a mechanical coupling is a hook coupled to both reset tab 22a and one of the springs 17a, such that when reset tab 22a is longitudinally pulled away from side wall 4a, one of springs 17a is partially compressed. As a result of the compression, ratchet wall 7a is longitudinally translated away from bracket 8, thereby partially detaching the housing from bracket 8. The detachment allows the housing to be translated to a different position with respect to bracket 8. When a user discontinues applying a pulling force on reset tab 22a, the partially compressed spring 17a decompresses, allowing ratchet wall 7a to mechanically couple with bracket 8. Accordingly, a user could use reset tabs 22a, 22b to select a comfortable position for the housing, such that the user's head is received by proximal wall 2. In addition, reset tabs 22a, 22b can be used to reposition the housing after an impact causes the housing to translate toward bracket 8.

Turning now to FIG. 3B, the housing is shown in a post-impact configuration. In the post-impact configuration, members 20a, 20b of proximal wall 2 radially translate about hinges 21a, 21b toward bracket 8. As such, proximal wall 2 is adapted to provide a comfortable resting place for a vehicle occupant's head by deforming and separating members 20a, 20b from one another. Proximal wall 2 thereby reduces the impact felt by the occupant, in part by providing a space for the occupant's head to be received during a collision. Similarly, interior proximal wall halves 11a, 11b deform about hinge 12, such that hinge 12 translates toward bracket 8.

The components within internal compartment 6 function to slow the translation of the occupant's head toward distal wall 3, and to prevent the occupant's head from quickly translating toward a front end of a vehicle after a collision, thereby reducing the risk of whiplash. For example, foam cushion 10 is disposed between proximal wall 2 and bracket 8 to slow the translation of reduced-impact-and-recoil headrest 1 toward bracket 8. Foam cushion 10 reduces part of the impact force by absorbing a portion of the kinetic energy from the translation of reduced-impact-and-recoil headrest 1. As such, foam cushion 10 slows the translation of reduced-impact-and-recoil headrest 1 toward bracket 8. In addition, the complementary tapers formed by the interaction between ratchet walls 7a, 7b and ratcheting surfaces 9a, 9b convert a portion of the kinetic energy from the collision into friction energy, thereby slowing reduced-impact-and-recoil headrest 1 as ratchet walls 7a, 7b slide down ratcheting surfaces 9a, 9b. Moreover, the tapers prevent reduced-impact-and-recoil headrest 1 from automatically translating back to its pre-impact position, reducing the occupant's risk of whiplash. After the collision, reduced-impact-and-recoil headrest 1 can be repositioned via reset tabs 22a, 22b, as discussed above.

Figure 3C:
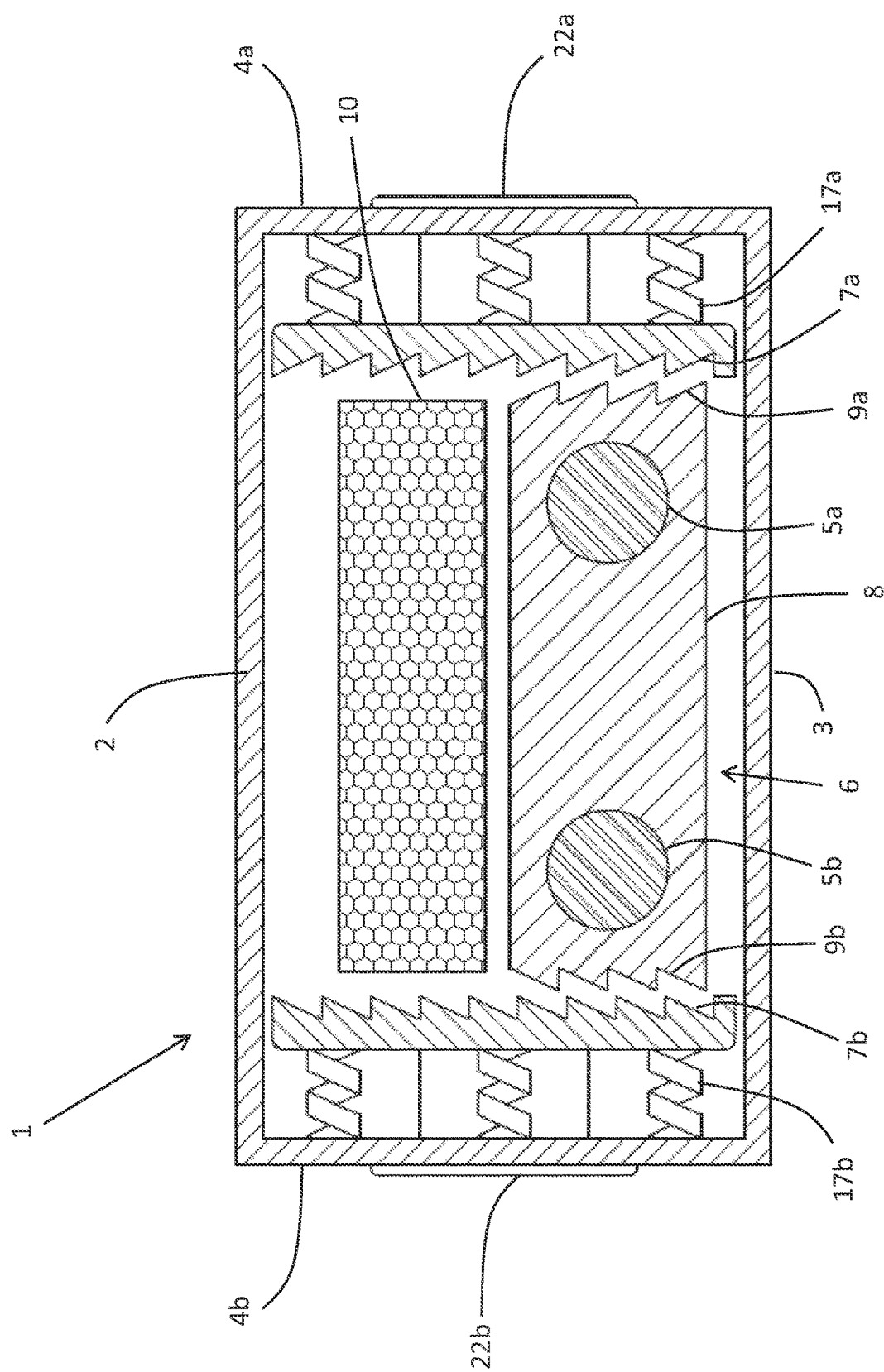
FIG. 3C is a cross-sectional view of a reduced-impact-and-recoil headrest with a nonstationary housing and a solid set of walls.

FIG. 3C shows an alternative embodiment of reduced-impact-and-recoil headrest 1 having a continuous and singular proximal wall 2, as well as the ratchet mechanism discussed in detail above. Reduced-impact-and-recoil headrest 1 may be disposed within a cushioned headrest casing, such that reduced-impact-and-recoil headrest 1 is surrounded by cushioning material adapted to provide a surface for an occupant's head. As such, reduced-impact-and-recoil headrest 1 is adapted to translate when impacted by the cushioned casing during a collision. Specifically, reduced-impact-and-recoil headrest 1 translates along the longitudinal axis of the vehicle and toward bracket 8, such that in a post-impact configuration, proximal wall 2 is disposed substantially adjacent to bracket 8. As discussed in detail above, the ratchet mechanism reduces the impact of a collision experienced by an occupant, as well as prevents the translation of reduced-impact-and-recoil headrest 1 toward the front end of the vehicle, thereby minimizing the risk of the occupant experiencing whiplash.

Figure 4A:
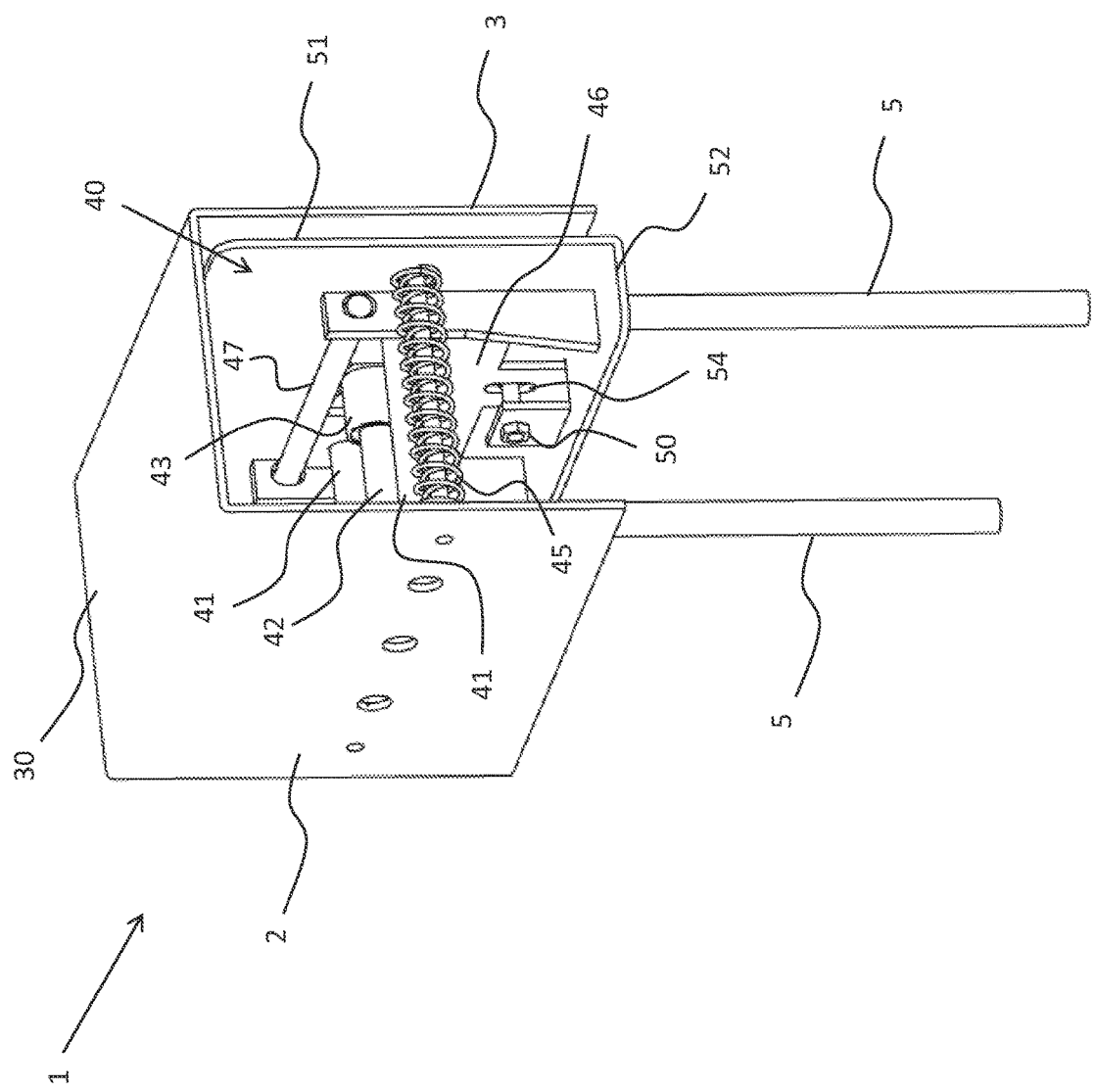
FIG. 4A is a perspective view of a reduced-impact-and-recoil headrest, in accordance with an embodiment of the present invention.
Figure 4B:
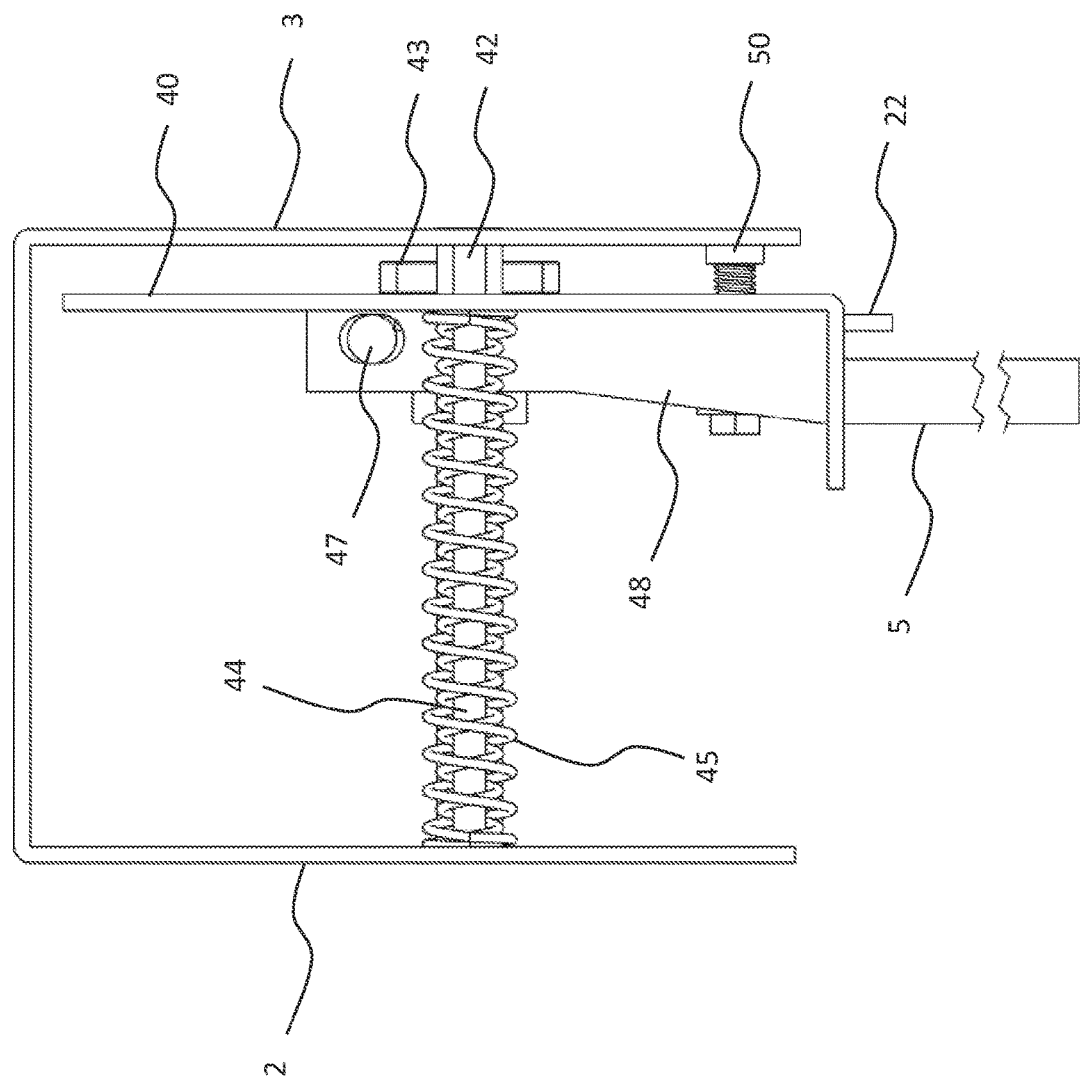
FIG. 4B is an orthogonal view of the reduced-impact-and-recoil headrest of FIG. 4A.
Figure 4C:
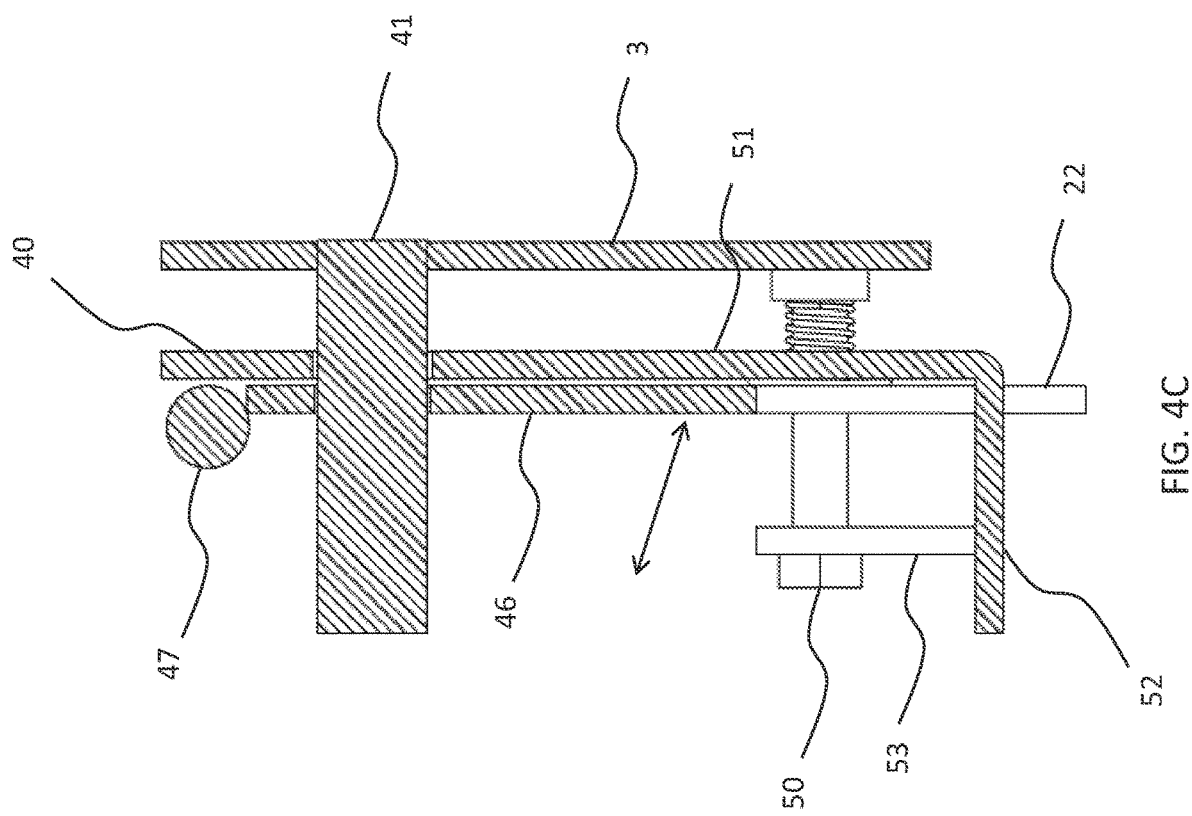
FIG. 4C is a cross-sectional view of the reduced-impact-and-recoil headrest of FIG. 4A.

As shown in FIGS. 4A-4C, an alternative embodiment of reduced-impact-and-recoil headrest 1 includes proximal wall 2 disposed proximate to a front-facing surface of a headrest, and an opposing distal wall 3 disposed between proximal wall 2 and a rear portion of a vehicle. Proximal wall 2 and distal wall 3 are indirectly coupled to each other via top wall 30, such that proximal wall 2, top wall 30, and distal wall 3 form an open housing disposed within an outer headrest, such as a cushioned headrest within a vehicle. In addition, reduced-impact-and-recoil headrest 1 includes fixed mounting plate 40 disposed between proximal wall 2 and distal wall 3. Mounting plate 40 includes vertical wall 51 that is oriented substantially parallel to distal wall 3, and bottom wall 52 that perpendicularly extends away from vertical wall 51 in a direction toward proximal wall 2.

Bottom wall 52 is coupled to a plurality of stalks 5 on a bottom-facing surface thereof that are configured to be received within preexisting apertures disposed within a vehicle seat, thereby installing reduced-impact-and-recoil headrest 1 on the vehicle seat, and such that mounting plate 40 is anchored to the vehicle seat. In addition, mounting plate 40 includes bracket 53 that extends perpendicularly away from bottom wall 52 in a direction toward top wall 30, with bracket 53 disposed between and oriented parallel to proximal wall 2 and distal wall 3.

A locking mechanism is disposed within reduced-impact-and-recoil headrest 1, spanning from proximal wall 2 to distal wall 3, and interacting with mounting plate 40. Specifically, the locking mechanism includes one or more locking rods 41 that include a first end secured to proximal wall 2, and an opposing second end secured to distal wall 3. In addition, central rod 42 similarly secures at a first end to proximal wall 2 and at a second end to distal wall 3. Central rod 42 is mechanically coupled to flange 43 which is secured to mounting plate 40 within reduced-impact-and-recoil headrest 1, such that flange 43 is disposed between proximal wall 2 and distal wall 3. Central rod 42 and flange 43 will be described in greater detail herein below. Moreover, one or more spring mounting rods 44 are similarly secured at a first end to proximal wall 2 and at a second end to distal wall 3. Each spring mounting rod 44 includes spring 45 disposed thereon, such as a concentric spring, such that spring 45 is mechanically coupled to each of proximal wall 2 and mounting plate 40. Spring 45 applies a force on proximal wall 2, forcing proximal wall 2 in a direction away from mounting plate 40. Accordingly, a distance between proximal wall 2 and mounting plate 40 determines a biasing force experienced by spring 45; as the distance between proximal wall 2 and mounting plate 40 decreases, spring 45 experiences a greater biasing force. If the biasing force experienced by spring 45 surpasses the force exerted on proximal wall 2 by spring 45, then proximal wall 2 translates in a direction toward mounting plate 40. Such a force would typically be experienced during a crashing event, and will be discussed herein below.

In addition, the locking mechanism includes locking plate 46 which resides within the interior compartment of reduced-impact-and-recoil headrest 1, disposed between proximal wall 2 and mounting plate 40. Locking plate 46 is spaced apart from mounting plate 40 and includes a pivoting mechanism that allows locking plate 46 to rotate with respect to mounting plate 40. The pivoting mechanism of locking plate 46 includes two opposing pivoting rod supports 48 that are disposed on opposing sides of central rod 42, with pivoting rod 47 spanning between the opposing pivoting rod supports 48 and indirectly coupling the opposing pivoting rod supports 48 to each other. Each pivoting rod support 48 is configured to reside adjacent to bottom wall 52 of mounting plate 40, such that a frictional force exists between each pivoting rod support 48 and bottom wall 52 of mounting plate 40.

In addition, locking plate 46 defines slot 54 disposed therethrough at a central point of locking plate 46 between the opposing pivoting rod supports 48. Locking plate 46 is configured to receive adjustment screw 50 disposed through slot 54, with a first end of adjustment screw 50 secured to distal wall 3, and a second end of adjustment screw 50 secured to bracket 53 of mounting plate 40. Slot 54 is defined within locking plate 46 such that slot 54 is elongated, with a vertical length defining slot 54 being at least twice a diameter of a body of adjustment screw 50, and with a horizontal width defining slot 54 being slightly greater than the diameter of the body of adjustment screw 50. As such, adjustment screw 50 is capable of residing within different discrete points of slot 54 along the vertical length thereof, without translating in the horizontal direction.

Through the locking mechanism described in greater detail above, locking plate 46 is pivotable with respect to mounting plate 40 and locking rods 41. In particular, by adjusting adjustment screw 50, locking plate 46 rotates about pivoting rod 47 to increase a contact surface between locking plate 46 and locking rods 41. As such, by tightening adjustment screw 50, locking plate 46 rotates in a clockwise orientation to increase a coefficient of friction between locking plate 46 and locking rods 41. Contrarily, by loosening adjustment screw 50, locking plate 46 rotates in a counterclockwise orientation to decrease the coefficient of friction between locking plate 46 and locking rods 41. An increase in the coefficient of friction between locking plate 46 and locking rods 41 corresponds with a greater force exerted against proximal wall 2, since both the biasing force of springs 45 and the friction force between locking plate 46 and locking rods 41 must be overcome to compress springs 45 and translate proximal wall 2 in a direction toward mounting plate 40. Similarly, a decrease in the coefficient of friction between locking plate 46 and locking rods 41 corresponds with a lesser force exerted against proximal wall 2, thereby requiring a lesser force to compress springs 45 and translate proximal wall 2 in a direction toward mounting plate 40.

In the event of a crash or other traumatic event that requires the use of reduced-impact-and-recoil headrest 1, proximal wall 2 translates in a direction toward mounting plate 40 after the friction force and the biasing force are both overcome. As proximal wall 2 translates toward a rear portion of a vehicle, springs 45 are compressed and reduced-impact-and-recoil headrest 1 cushions an occupant's head and neck. In addition, to prevent a recoil of both headrest 1 and the occupant's head, central rod 42 passes through flange 43 in a one-way movement due to a linear bearing disposed within flange 43 and in mechanical communication with central rod 42. As such, flange 43 restricts the translation of central rod 42 to the direction toward the rear portion of the vehicle. After the crash event terminates, reduced-impact-and-recoil headrest 1 can be reset via reset tab 22, which is in mechanical communication with locking plate 46, such that a user can manually disengage locking plate 46 from locking rods 41 and translate locking rods 41, and thereby distal wall 3, in a direction toward a front portion of the vehicle.

Glossary of Claim Terms

Biasing Member: is a device adapted to rebound back to a position of repose when it is no longer subject to an external force.

Housing: is a casing defining an interior compartment and including a proximal wall and a distal wall.

Lateral Axis: extending from a driver side of a vehicle to a passenger side of the vehicle.

Longitudinal Axis: extending from a front bumper of a vehicle to a rear bumper of the vehicle.

Post-Impact Configuration: is a configuration of a reduced-impact-and-recoil headrest, particularly referring to the spatial relationship between a housing and a fixed mounting plate, prior to a collision.

Pre-Impact Configuration: is a configuration of a reduced-impact-and-recoil headrest, particularly referring to the spatial relationship between a housing and a fixed mounting plate, after a collision.

Stalk: is a member that extends in a direction away from a housing that is designed to be received by an aperture to anchor the housing within a vehicle seat.

REFERENCES

[1] National Safety Council. Everyone Has a Role in Making Our Roads Safer. Dec. 14, 2017.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A headrest comprising:
    a housing having proximal wall opposite a distal wall, the housing adapted to be installed within a vehicle having a longitudinal axis from a front bumper to a rear bumper, and a lateral axis from a driver side to a passenger side, with the distal wall oriented between the proximal wall and the rear bumper of the vehicle;
    a fixed mounting plate disposed between the proximal wall and the distal wall, the fixed mounting plate including a vertical wall that is oriented substantially parallel to each of the proximal wall and the distal wall and a bottom wall that extends perpendicularly away from the vertical wall in a direction toward the proximal wall, with a set of stalks extending in a direction away from the bottom wall, the set of stalks configured to be received by a pair of complementary apertures disposed on an upper surface of a vehicle seat;
    a locking plate disposed adjacent to the fixed mounting plate, such that the locking plate is disposed between the fixed mounting plate and the proximal wall of the housing;
    a flange affixed to the fixed mounting plate, wherein the flange is configured to receive a central rod therethrough, whereby the central rod is secured at a first end to the proximal wall of the housing and secured at an opposing second end to the distal wall of the housing;
    a locking rod secured at a first end to the proximal wall of the housing and secured at an opposing second end to the distal wall of the housing, such that the locking rod is mechanically coupled to the locking plate, and such that the locking rod experiences a friction force resulting from a coefficient of friction between the locking rod and the locking plate;
    wherein the distal wall of the housing is configured to be adjacent to the fixed mounting plate in a pre-impact configuration, and proximal wall of the housing is configured to be adjacent to the fixed mounting plate in a post-impact configuration; and
    wherein when an impact force is applied to the housing, the locking rod is configured to limit, inhibit, or both a translation of the proximal wall in a direction toward the fixed mounting plate, based on the impact force, due to the friction force between the locking rod and the locking plate.

2. The headrest of claim 1, wherein the locking rod is a first locking rod, further comprising a second locking rod secured at a first end to the proximal wall of the housing and secured at an opposing second end to the distal wall of the housing, such that the second locking rod is mechanically coupled to the locking plate, and such that the second locking rod experiences a friction force resulting from a coefficient of friction between the second locking rod and the locking plate.

3. The headrest of claim 1, wherein the flange further comprises a bearing disposed therein that is mechanically coupled to the central rod to restrict axial movement thereof.

4. The headrest of claim 1, further comprising a set of opposing pivoting rod supports, each pivoting rod support coupled to the locking plate, with a bottom surface of each pivoting rod support residing adjacent to the bottom wall of the fixed mounting plate.

5. The headrest of claim 4, further comprising a pivoting rod coupled to and spanning between the opposing pivoting rod supports, such that the locking plate is configured to rotate about the pivoting rod, wherein a clockwise rotation of the locking plate increases a contacting surface between the locking rod and the locking plate, thereby increasing the friction force experienced by the locking rod.

6. The headrest of claim 5, further comprising an elongated slot defined within the locking plate and an adjustment screw disposed through the slot and secured to a bracket of the fixed mounting plate, the bracket extending perpendicularly in a direction away from the bottom wall of the fixed mounting plate, wherein the adjustment screw is configured to rotate the locking plate about the pivoting rod when the adjustment screw is tightened.

7. The headrest of claim 1, wherein the flange is disposed adjacent to the locking plate.

8. The headrest of claim 7, wherein the flange further comprises a bearing disposed therein that is mechanically coupled to the central rod to restrict axial movement thereof.

9. The headrest of claim 1, further comprising a mounting rod secured at a first end to the proximal wall of the housing and secured at an opposing second end to the fixed mounting plate.

10. The headrest of claim 9, further comprising a biasing member disposed on the mounting rod, with the biasing member in mechanical communication to each of the proximal wall and the fixed mounting plate, wherein the biasing member exerts a force on the proximal wall in a direction away from the fixed mounting plate.

11. The headrest of claim 10, wherein the biasing member is a concentric spring.

12. The headrest of claim 9, wherein the mounting rod is a first mounting rod, further comprising a second mounting rod secured at a first end to the proximal wall of the housing and secured at an opposing second end to the fixed mounting plate, the second mounting rod being spaced apart from the first mounting rod.

13. The headrest of claim 12, further comprising a biasing member disposed on each of the first mounting rod and the second mounting rod, with the biasing members each being in mechanical communication to each of the proximal wall and the fixed mounting plate, wherein each biasing member exerts a force on the proximal wall in a direction away from the fixed mounting plate.

14. The headrest of claim 1, further comprising a reset tab in mechanical communication with the locking plate, wherein the reset tab is configured to receive a force to detach the locking plate from the fixed mounting plate, such that the distal wall can be reset to be disposed adjacent to the fixed mounting plate.

* * * * *